Feb. 23, 1926.
E. H. RADABAUGH
1,574,690
ACIDPROOF CONTAINER
Filed July 14, 1925
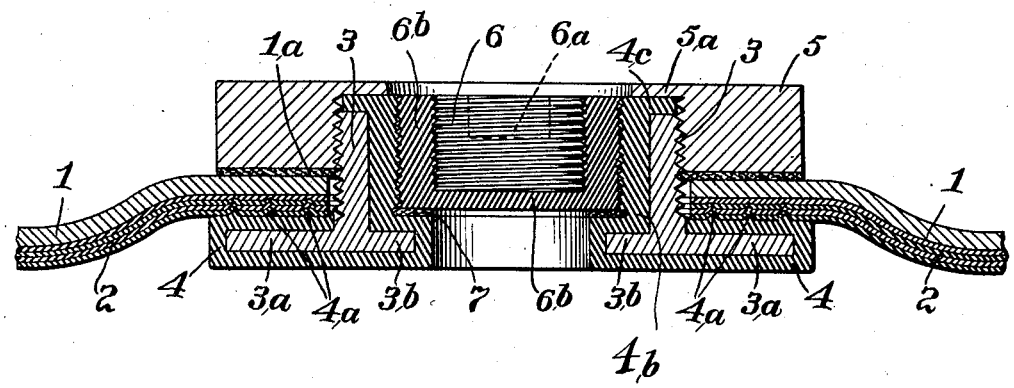
Inventor:
Eli H. Radabaugh,
by Spear Middleton Donaldson & Hall
Attys.

Patented Feb. 23, 1926.

1,574,690

UNITED STATES PATENT OFFICE.

ELI H. RADABAUGH, OF AKRON, OHIO, ASSIGNOR TO THE MILLER RUBBER COMPANY, OF AKRON, OHIO. A CORPORATION OF OHIO.

ACID-PROOF CONTAINER.

Application filed July 14, 1925. Serial No. 43,529.

*To all whom it may concern:*

Be it known that I, ELI H. RADABAUGH, a citizen of the United States, and resident of Akron, in the county of Summit and State of Ohio, have invented certain new and useful Improvements in Acid-Proof Containers, of which the following is a specification.

My present invention relates to improvements in rubber lined acid-proof containers, and concerns more particularly the bung openings thereof.

Difficulty has heretofore been experienced in providing a rubber-lined acid-proof container with a bung opening which would permanently remain acid-proof, and the present invention aims to provide a construction in which there will be no danger of rupture of the lining adjacent the bung, or leakage or corrosive action at that point.

With this and other objects in view, the invention includes the novel features of construction and arrangement and combination of parts hereinafter described, the precise nature and scope of the invention being defined and ascertained by the claims appended hereto.

The invention is illustrated in the accompanying drawing, in which—

The figure is a sectional view showing a sufficient portion of the container (specifically one wall thereof having a bung opening) with the bung and bung carrying parts in assembled or closure effecting position.

Referring by reference characters to this drawing, the numeral 1 designates the wall of the container which, of course, may be of any desired size or shape, and which is provided with a rubber lining 2 preferably of the character of and applied thereto in the manner disclosed in the application of Raymond M. Warner, filed of even date herewith. The container wall is provided with an opening 1ª within which is located a ferrule 3 which has a base flange 3ª which overlies the rubber lining 2 and which base flange is provided with a covering of hard rubber 4. The surface of the hard rubber covering 4 is preferably serrated as indicated at 4ª to grip onto the rubber lining and effect a tight engagement therewith when drawn up by the action of the clamping or lock nut 5, which is preferably made of acid resisting material.

Preferably the hard rubber covering 4 is carried up on the inside of the bushing 3, as indicated at 4ᵇ and overlaps the top thereof, as indicated at 4ᶜ, the lock nut having a projecting flange 5ª which bears against the top of the hard rubber lining above the bushing. The lining portion 4ᵇ of hard rubber is provided with internal screw threads as shown, to receive the bung, which has a hard rubber threaded portion to coact therewith. While a solid hard rubber plug or bung could be used, I prefer to use a metal plug 6 having a tool receiving socket 6ª, which plug is covered on its bottom and periphery with hard rubber, as indicated at 6ᵇ, which is vulcanized thereon. Preferably the ferrule is provided with a flange 3ᵇ which extends inward and overlies the edge of the bung opening, being likewise covered with hard rubber, which hard rubber forms a seat for a gasket, indicated at 7.

Having thus described my invention, what I claim is:—

1. The combination with a rubber lined metal container provided with an opening in the wall thereof, of a metal ferrule seated in said opening having an outwardly extending annular flange at its inner end overlapping the rubber lining, said flage having a covering of hard rubber, said ferrule having a threaded exterior, a lock nut cooperating with said threaded portion, and an acid-proof closure plug cooperating with said ferrule.

2. In combination, a rubber lined metal container provided with an opening in a wall thereof, a metal ferrule located in said opening and having at its inner end an outwardly extending flange underlying the lining of the container wall and having also at said inner end an inwardly projecting annular flange, said flanges and the bore of the bushing having a covering of hard rubber, locking means engaging the ferrule for holding it in place, and an acid-proof bung cooperating with the ferrule.

3. In combination, a rubber lined metal container provided with an opening in a wall thereof, a metal ferrule located in said opening and having at its inner end an outwardly extending flange underlying the lining of the container wall and having also at said inner end an inwardly projecting annular flange, said flanges and the bore of the bushing having a covering of hard rubber, the covering of the bore of the bushing extending above the bore and having an outwardly extending flange overlying the top of the bushing, and a lock nut having a threaded engagement with the exterior of the bushing, said lock nut having an inwardly directed annular flange overlying the covering at the top of the bushing.

In testimony whereof, I affix my signature.

ELI H. RADABAUGH.